United States Patent [19]

Priesner

[11] Patent Number: 4,911,366

[45] Date of Patent: Mar. 27, 1990

[54] FUEL INJECTION VALVE FOR AIR-COMPRESSING INTERNAL COMBUSTION ENGINES WITH FUEL INJECTION

[75] Inventor: Helmut Priesner, Steyr, Austria

[73] Assignee: Steyr-Daimler-Puch AG, Vienna, Austria

[21] Appl. No.: 351,803

[22] Filed: May 15, 1989

[30] Foreign Application Priority Data

May 16, 1988 [AT] Austria ................................. 1262/88

[51] Int. Cl.$^4$ ............................................ F02M 63/00
[52] U.S. Cl. ................................. 239/533.3; 239/533.9
[58] Field of Search ............... 239/533.2, 533.3, 533.9, 239/533.11

[56] References Cited

U.S. PATENT DOCUMENTS

| | | | |
|---|---|---|---|
| 4,417,693 | 11/1983 | Füssner et al. ............... | 239/533.9 X |
| 4,535,939 | 8/1985 | Skinner ............................. | 239/533.3 |
| 4,650,121 | 3/1987 | Augustin ..................... | 239/533.11 X |

FOREIGN PATENT DOCUMENTS

| | | |
|---|---|---|
| 0017872 | 10/1980 | European Pat. Off. . |
| 3041018 | 3/1986 | Fed. Rep. of Germany . |
| 664884 | 1/1952 | United Kingdom . |
| 1110102 | 4/1968 | United Kingdom . |
| 2080414 | 2/1982 | United Kingdom ............. 239/533.9 |

*Primary Examiner*—Andres Kashinkow
*Assistant Examiner*—William Grant
*Attorney, Agent, or Firm*—Marmorek, Guttman & Rubenstein

[57] ABSTRACT

A fuel injection valve for air-compressing internal combustion engines comprises a nozzle holder, a nozzle body and a pintle, which is operable by the application of fuel pressure against the force of a closing spring, which is accommodated in a spring chamber of the nozzle holder. The pintle cooperates with a damper, which comprises a fuel-filled damper chamber, which opens into a constricted passage. A separate damper piston is interposed between the pintle and the damper chamber and enters the damper chamber and is nonpositively connected to the pintle. To provide an inexpensive and highly effective damper, either the damper chamber is formed in an adapter, which defines that end of the spring chamber of the nozzle holder which is adjacent to the pintle, the adapter contains the damper piston, which is used to transmit force between the closing spring and the pintle.

10 Claims, 2 Drawing Sheets

FUEL INJECTION VALVE FOR AIR-COMPRESSING INTERNAL COMBUSTION ENGINES WITH FUEL INJECTION

BACKGROUND OF THE INVENTION

1. Field of the Invention

This invention relates to a fuel injection valve for air-compressing internal combustion engines with fuel injection, particularly with direct fuel injection, comprising a nozzle holder, a nozzle body and a pintle, which is operable by the application of fuel pressure against the force of a closing spring, which is accommodated in a spring chamber of the nozzle holder and which pintle cooperates with a damper, which comprises a fuel-filled damper chamber, which opens into a constricted passage, and a separate damper piston, which is interposed between the pintle and the damper chamber and enters the damper chamber and is non-positively connected to the pintle.

2. Description of the Prior Art

In order to prevent a deformation of the pintle end of the pintle stop and to permit a control of the timing of the fuel injection proper, which timing will influence the combustion process and the quality of the combustion, it is known to provide a fuel injection valve with a damper, which comprises a separate damper piston for damping the movement of the pintle in the opening sense because that movement involves a displacement of the fluid out of the damper chamber through the constricted passage.

Whereas such a fuel injection valve has already been disclosed in GB-A-664 884, that known fuel injection valve can be combined only with a special constricted nozzle and does not permit the use of conventional nozzles, which are provided with a desired damper, and also does not permit the economical use of conventional components to a large extent.

DE-A-30 41 018 discloses a fuel injection valve in which the nozzle body has a bore which guides the pintle and has an end portion which is adjacent to the spring chamber of the nozzle holder and serves as a damper chamber. The pintle constitutes a displacer for displacing fuel contained in the damper chamber into the spring chamber through the constricted passage, which is formed in a disk or in an adapter disposed between the nozzle body and the nozzle holder. As a result an expensive alteration of the conventional fuel injection nozzles and the components thereof is required and the damping action is limited, particularly owing to the predetermined dimensions of the pintle, the thrust pin provided between the pintle and the mushroom-shaped abutment for the closing spring, and the damper chamber. Stronger damping actions cannot be achieved unless the constricted passage is extremely small, so that the manufacture will be virtually uncontrollable because the leakage losses may be of the same order as the rate of fuel being throttled. Besides, a separation of the pintle and the plunger would be desired but in that case these two components may be lifted from each other so that the damping action will be eliminated. Besides, the damper chamber adjoins the joint between the nozzle body and the adapter so that the high pressure in the damper chamber may give rise to problems due to leakage. For this reason that known damper may be used, at best, in fuel injection valves for engines having a precombustion chamber rather than in fuel injection valves for engines for direct fuel injection which are operated under much higher fuel injection pressures and with a smaller needle stroke and often with lower rated speeds so that much stronger damping actions are required.

SUMMARY OF THE INVENTION

For this reason it is an object of the invention to eliminate these disadvantages and to provide a fuel injection valve which is of the kind described first hereinbefore and has a rather simple design and distinguishes by including a particularly effective damper, which is highly adaptable to the conditions existing in each case, and which valve permits the use of a desired damper in conventional fuel injection nozzles and an econimical use of conventional components to a large extent.

That object is accomplished in accordance with the invention in that either the damper chamber is formed in an adapter, which defines that end of the spring chamber of the nozzle holder which is adjacent to the pintle, said adapter contains the damper piston, which is used to transmit force between the closing spring and the pintle, and the spring chamber communicates with a space disposed between the damper piston and the piston through a venting passage, which extends through the adapter, or a bushing is mounted in the nozzle holder and defines the damper chamber, which is provided at that end of the spring chamber which is remote from the pintle, and the damper piston is operable against the force of a return spring by means of a thrust pin through the intermediary of a mushroom-shaped abutment by which the closing spring is supported on the pintle.

The damper piston and the closing spring are virtually connected in series and the damper piston is gripped between the pintle and the plunger, to which pressure is applied by the closing spring. As a result, it is sufficient to provide the means defining the damper chamber with the passages required for the damper piston and the thrust pin. In dependence on its shape and size the adapter may adjoin the nozzle body directly or with an additional ring interposed. For this reason, the designer will be free also as regards the design and sealing of the joint between the nozzle body and the adapter or nozzle holder of the stop for the pintle and the like. The damper may be used with conventional fuel injection nozzle and may be composed of separate components and substantial parts of the fuel injection valve of conventional fuel injection valves may be used without an alteration so that the manufacturing costs will be low although a special damping action may be achieved.

If the damper chamber and the damper piston are disposed at that end of the spring chamber which is remote from the pintle and the damper piston can be operated against the force of return spring by a thrust pin acting on the mushroom-shaped abutment by which the closing spring is supported on the pintle, the closing spring and the damper piston are connected in parallel. This affords the special advantage that a separate passage in which the thrust pin extends through the damper chamber is not required. The entire crosssection of the damper piston contributes to the damping action and it is sufficient to seal the damper piston from the damper chamber. To ensure the non-positive connection between the thrust mushroom and the damper piston and thrust pin, it is necessary to provide a return spring. But the entire nozzle the adapter, the mushroom-shaped abutment and the closing spring which are conventionally used in known fuel injection valves may be employed here.

The provision of a bushing which is inserted into the nozzle holder and defines the damper chamber and the constricted passage will ensure that the damper will have the desired wear resistance regardless of the material of which the nozzle holder is made, provided that said bushing is made of a suitable material.

In accordance with a particularly preferred feature of the invention a stop is provided for defining a predetermined initial position of the damper piston so that the time at which the damping action begins can be adjusted and, e.g., a certain part of the needle stroke may be undamped.

The constricted passage may be arranged at any desired location and may connect the damper chamber to the leakage oil system of the engine, which system is under an optionally controllable pressure, or may connect the damper chamber to the spring chamber of the nozzle holder, which leakage oil system contains no leakage oil. For that purpose the constricted passage may simply be disposed in the valve member which defines the damper chamber, such as the adapter or the bushing. But is is contemplated within the scope of the invention to have the constricted passage defined by the damper piston so that the damper chamber may communicate through an axial piston bore and a radially or axially opening constricted passage with a suitable low-pressure system, such as the space between the pintle and the rear end of the damper piston in case of a series connection or into the spring chamber in case of a parallel connection.

DETAILED DESCRIPTION OF THE PREFERRED EMBODIMENT

Figure 1:
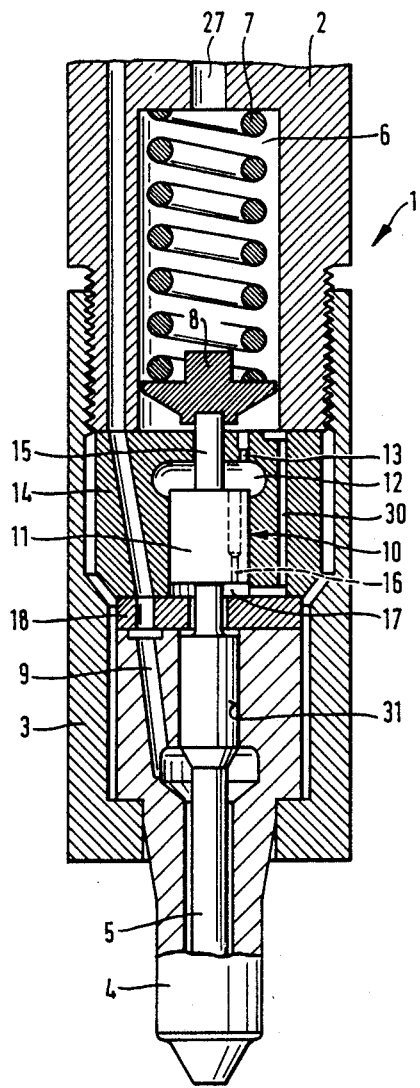
FIG. 1 is an axial sectional view showing a fuel injection valve which embodies the invention.

The subject matter of the invention is diagrammatically illustrated in the drawing.

FIG. 1 shows a fuel injection valve 1 of an air-compressing internal combustion engine with fuel injection. That valve 1 essentially consists of a nozzle holder 2, a nozzle body 4, which is secured to the nozzle holder 2 by a nozzle clamping nut 3, and a pintle 5, which is guided in the nozzle body 4. A closing spring 7 is accommodated in a spring chamber 6 of the nozzle holder and is supported on a mushroom-shaped abutment 8 and biases the pintle 5 in a closing sense. A fuel pressure line 9 extends into the nozzle body 4. Upon an application of fuel pressure, the pintle 5 will be operated against the force of the closing spring to open the nozzle for an injection of fuel.

In order to damp the opening movement of the pintle 5, a damper 10 is provided, which consists of a separate damper piston 11 and a damper chamber 12 that communicates with a constricted passage 13. At that end which is adjacent to the pintle 5, the spring chamber 6 of the nozzle holder 2 is closed by an adapter 14, which accommodates the damper 10. The damper piston 11 is arranged to transmit force between the closing spring 7 and the pintle 5 and is gripped between the pintle 5 and a thrust pin 15, which is biased by the closing spring 7 via the mushroom-shaped abutment 8. There is a series connection of the damper piston 11 and the closing spring 7. By a venting passage 30 extending through the adapter 14, the spring chamber 6 is connected to the space 17 provided between the damper piston 11 and the pintle 5 or ring 18, which is interposed to limit the stroke of the needle. That venting passage 30 will ensure that a pressure which would adversely affect the pressure applied to the pintle 5 in the opening and/or closing sense will not build up in the space 17.

As soon as the pintle 5 begins to rise, the damper piston 11 will enter the damper chamber 12 and fuel contained in the damper chamber will be displaced by the damper piston 11 through the constricted passage 13 into the spring chamber 6. As a result, the needle stroke will be damped. Owing to the provision of a separate damper piston 11 as a displacer and the fact that the damper chamber 12 is independent of the bore 31 for guiding the pintle 5, the damping action of the damper 10 can be varied to a large extent and can be adapted to a wide range of conditions because the dimensions of the damper piston 11 and the associated damper chamber 12 can freely be chosen. Besides, the piston diameter may so be chosen that the pressures applied for a desired damping action may be sufficiently low so that non-positively interconnected elements will not lift from each other. The constricted passage 13 may be so large in diameter that its manufacture will not be difficult. Because the damper 10 is composed of separate components, essential parts of the fuel injection valve 1 may consist of unaltered parts used in known fuel injection valves so that a strong damping action may be achieved whereas the manufacturing costs will remain low.

As is indicated by dotted lines the damper piston 11 may be formed with a constricted axial bore 16, which constitutes the constricted passage that communicates with the damper chamber 12 so that the damper chamber 12 opens into the space 17 between the damper piston 11 and the pintle 5 or an interposed ring 18 which limits the needle stroke. That interposed ring 18 may be integral with the adapter 14 or may be omitted if the needle stroke is limited by the damper piston 11.

Figure 2:
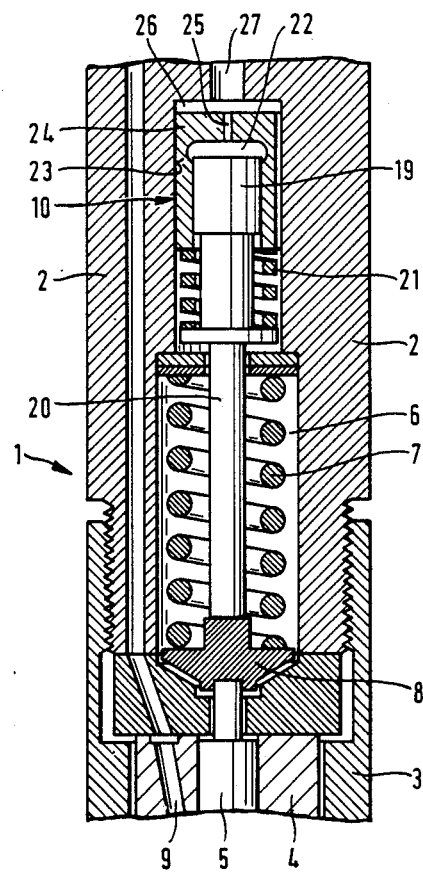
FIG. 2 is also an axial sectional view and shows another illustrative embodiment of a fuel injection valve which embodies the invention

In the embodiment shown in FIG. 2 the damper 10 and the closing spring 7 are connected in parallel and the damper is disposed at the end of the spring chamber 6 formed in the nozzle holder 2 which is remote from the pintle. By means of a thrust pin 20 the damper piston 19 is operated via the mushroom-shaped abutment 8 for the closing spring 7. That thrust pin 20 is integral with the damper piston 19 and under the pressure of a return spring 21 is non-positively connected to the mushroom-shaped abutment 8. The damper chamber 22 is formed in a bushing 24, which has been inserted into an opening 23 of the nozzle holder, and the constricted passage 25 formed in the bottom of the bushing communicates via a collecting groove 26 with a leakage oil passage 27 of the nozzle holder. The return spring 21 is gripped between the bushing 24 and a collar of the thrust pin 20. The return spring 21 might alternatively be accommodated in the damper chamber 22 and bias the bottom of the damper piston.

Figure 3:
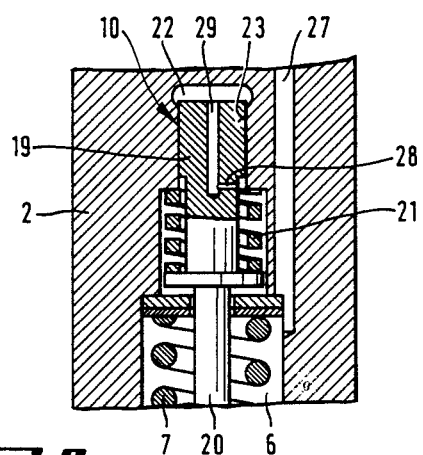
FIG. 3 is a fragmentary view showing a modified part of the fuel injection valve shown in FIG. 2.

As has been indicated in FIG. 3 the bushing 24 inserted into the opening 23 of the nozzle holder may be omitted and the opening 23 may constitute the damper chamber 22 of the damper 10. In that case the constricted passage 28 is desirably formed in the damper piston and the damper chamber 22 communicates through an axial bore 29 in the piston with the spring chamber 6. In all said modified designs there is no longer a passage for a thrust pin extending through the damper chamber 22 and the entire cross-section of the damper piston 19 contributes to the damper action.

Figure 4:
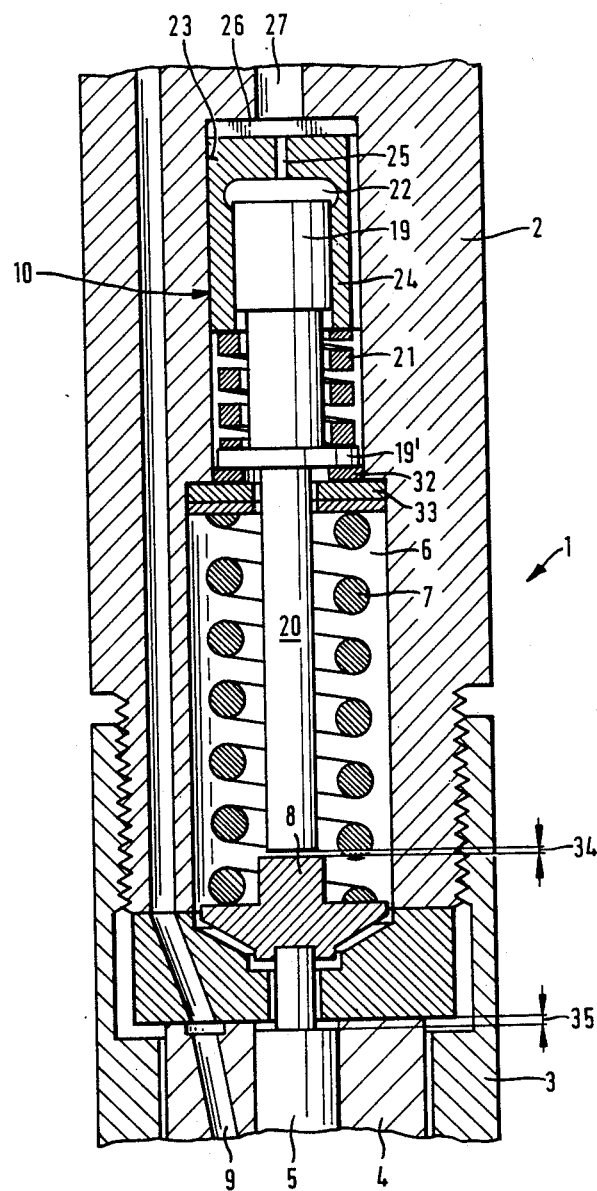
FIG. 4 is a fragmentary view showing another modified part of the fuel injection valve shown in FIG. 2.

In accordance with FIG. 4, which shows a part of FIG. 2, the closing spring 7 bears on a disk 33 on the nozzle holder 2 at that end of the spring chamber 6 which is remote from the pintle and the disk 33 together with the stop ring 32 constitute a stop for the damper piston 19 in its initial position, in which a collar 19' of the damper piston 19 engages the spacer ring of the stop 32. When the damper piston 19 is in its initial position the thrust pin cooperating with the piston 19 defines with the mushroom-shaped abutment 8 a gap 34, which is smaller than the gap 35 which is defined by the stroke of the pintle 5. The time at which the damping action begins can be adjusted by a suitable selection of the spacer ring 32. The gap 34 will define that portion of the gap 35 for the needle stroke in which the needle stroke will not be damped.

The damper 10 in accordance with the invention involves a relatively low structural expenditure and ensures a strong damping action so that it is most suitable for use in engines for a direct fuel injection. It may be combined with fuel injection valves of any desired type, e.g., with single-stroke or double-stroke fuel injection valves.

I claim:

1. In a fuel injection valve for air-compressing internal combustion engines with fuel injection, comprising
a nozzle holder defining an interior spring chamber;
a nozzle body mounted on said nozzle holder;
a pintle, which is mounted in said nozzle body for reciprocation in opening and closing senses, said spring chamber having one end that is adjacent to said pintle;
a closing spring urging said pintle in a closing sense;
means for applying fuel pressure to said pintle in an opening sense; and a damper, which defines a damper chamber adapted to be filled with fuel and a constricted passage for discharging fuel from said damper chamber,
said damper comprising a damper piston, which is disposed between said pintle and said damper chamber and is non-positively connected to said pintle and adapted to enter said damper chamber so as to displace the fuel therein through said constricted passage,
the improvement residing in that
an adapter is provided, which defines said spring chamber at said one end thereof and also defines said damper chamber and accommodates said damper piston, which is arranged to transmit force btween said closing spring and said pintle;
a space is defined in said nozzle body between said damper piston and said pintle; and
said adapter is formed with a venting passage, which connects said spring chamber to said space.

2. The improvement set forth in claim 1 as applied to a fuel injection valve for air-compressing internal combustion engines with direct fuel injection.

3. The improvement set forth in claim 1, wherein stop means are provided which define an initial position of said damper piston.

4. The improvement set forth in claim 1, wherein said constricted passage is defined by said damper piston.

5. In a fuel injection valve for air-compressing internal combustion engines with fuel injection, comprising
a nozzle holder defining an interior spring chamber;
a nozzle body mounted on said nozzle holder;
a pintle, which is mounted in said nozzle body for reciprocation in opening and closing senses, said spring chamber having one end that is adjacent to said pintle;
a closing spring urging said pintle in a closing sense;
means for applying fuel pressure to said pintle in an opening sense; and
a damper, which defines a damper chamber adapted to be filled with fuel and a constricted passage for discharging fuel from said damper chamber,
said damper comprising a damper piston, which is disposed between said pintle and said damber chamber and is non-positively connected to said pintle and adapted to enter said damper chamber so as to displace the fuel therein through said constricted passage and
said spring chamber has a second end that is remote from said pintle,
the improvement residing in that said damper chamber is disposed in said nozzle holder adjacent to said second end of said spring chamber,
said pintle carries a mushroom-shaped abutment, which is engaged by said closing spring,
a thrust pin is arranged to transmit force from said abutment to said damper piston, and
a return spring is arranged to oppose said force.

6. The improvement set forth in claim 5 as applied to a fuel injection valve for air-compressing internal combustion engines with direct fuel injection.

7. The improvement set forth in claim 5, wherein stop means are provided which define an initial position of said damper piston.

8. The improvement set forth in claim 5, wherein said constricted passage is defined by said damper piston.

9. The improvement set forth in claim 5, wherein a bushing is mounted in said nozzle holder and defines said damper chamber.

10. The improvement set forth in claim 9, wherein said bushing has a bottom that is formed with said constricted passage.

* * * * *